US012420398B2

(12) United States Patent
Stephens et al.

(10) Patent No.: US 12,420,398 B2
(45) Date of Patent: *Sep. 23, 2025

(54) JET DRIVE MARINE ENGINE MAINTENANCE TOOL

(71) Applicant: Jet Medic LLC, St. Clair, MO (US)

(72) Inventors: C. Shane Stephens, St. Clair, MO (US); T. Benjamin Boyher, Eureka, MO (US)

(73) Assignee: Jet Medic LLC, St Clair, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,165

(22) Filed: Apr. 16, 2023

(65) Prior Publication Data

US 2023/0278183 A1 Sep. 7, 2023

Related U.S. Application Data

(63) Continuation of application No. 16/893,230, filed on Jun. 4, 2020, now Pat. No. 11,628,551.

(60) Provisional application No. 62/856,807, filed on Jun. 4, 2019.

(51) Int. Cl.

| | |
|---|---|
| ***B25F 1/00*** | (2006.01) |
| ***B25B 13/04*** | (2006.01) |
| ***B63H 11/08*** | (2006.01) |

(52) U.S. Cl.

CPC ................ *B25F 1/00* (2013.01); *B25B 13/04* (2013.01); *B63H 11/08* (2013.01); *B63H 2011/081* (2013.01)

(58) Field of Classification Search

CPC ........... B25F 1/00; B25B 13/04; B63H 11/08; B63H 2011/081; B63H 2020/008

USPC .............................................................. 7/138

See application file for complete search history.

(56) References Cited

U.S. PATENT DOCUMENTS

| | | | | |
|---|---|---|---|---|
| 395,598 A | | 1/1889 | Waggoner | |
| 510,981 A | | 12/1893 | Massey | |
| 1,458,690 A | * | 6/1923 | Elwell | H01T 21/04 7/100 |
| 1,645,999 A | | 10/1927 | Reboul | |
| 1,820,364 A | * | 8/1931 | Pringle | B25B 27/0035 7/169 |
| 4,089,077 A | | 5/1978 | Morton | |
| 4,408,505 A | * | 10/1983 | Cook | B25F 1/00 81/437 |

(Continued)

*Primary Examiner* — Hadi Shakeri

(74) *Attorney, Agent, or Firm* — David E. Crawford; Fast Forward Law, LLC

(57) ABSTRACT

A multipurpose maintenance tool for a mechanical assembly. The tool includes a central body and an elongated shank extending in a longitudinal direction from the central body to a lever end. A foreign object removing element has a foreign body engaging surface. The element extends from the central body generally opposite the shank. A fastener engaging formation is formed on the shank, the removing element, and/or the central body. The formation is sized and shaped for engaging a fastener on the assembly to selectively tighten and loosen the fastener. A lateral extension extends from the central body to span an opening in the assembly and engage opposite margins adjacent the opening. As the shank is pivoted about the extension, the removal surface pivots about the lateral extension in a direction corresponding to the angular direction of the shank to dislodge foreign objects from the opening in the assembly.

19 Claims, 6 Drawing Sheets

(56) References Cited

U.S. PATENT DOCUMENTS

| | | | |
|---|---|---|---|
| 4,716,610 | A | 1/1988 | Therkildsen et al. |
| 7,926,393 | B2 | 4/2011 | Hart |
| 8,065,938 | B1 | 11/2011 | Kravitch |
| 9,751,223 | B2 | 9/2017 | Raymond |
| 11,125,535 | B2 | 9/2021 | Blish |
| 2013/0192005 | A1 | 8/2013 | Christenson |

* cited by examiner

JET DRIVE MARINE ENGINE MAINTENANCE TOOL

CROSS-REFERENCE TO RELATED APPLICATION

This application is a continuation of U.S. patent application Ser. No. 16/893,230 filed Jun. 4, 2020, which claimed benefit of and priority to U.S. Provisional Patent Application No. 62/856,807, filed on Jun. 4, 2019, both of which are hereby incorporated by reference in their respective entireties.

BACKGROUND

The present disclosure relates to tools and more particularly, to a unitary multipurpose tool for maintaining mechanical assemblies such as jet drive marine engines.

Jet drive marine engines, which are sometimes referred to as pump-jet propulsion, are used to provide thrust for watercraft from jet skis to larger boats powered by inboard and outboard engines. Although less efficient than an open propeller, jet drives are particularly useful in very shallow water. The jet drive engines eliminate the laceration dangers of an open propeller. And, jet drive marine engines are less susceptible to damage than conventional propeller drive marine engines, particularly in shallow water. Although jet drive engines tend to require less maintenance than traditional external propeller motors, they must be periodically maintained to ensure expected life and performance.

As illustrated in FIG. 1, watercraft, generally identified by the reference number 10, is powered by an outboard jet drive marine engine, generally designated by 12, attached to a transom 14 spanning an aft end 16 of the boat 10. The engine 12 includes a motor housing 18 enclosing a motor (not shown). A lower housing 20 mounted below the motor housing 18 has an internal stationary passage 30 extending from an inlet 32 at an upstream end to an outlet 34 at a downstream end. A drive shaft 36 operatively connects the motor to an impeller 40 rotatably mounted in the passage 30. The motor rotates the driveshaft 36, which rotates the impeller 40 in the passage 30, pulling water into the passage through the inlet 32 and forcing a stream of water out of the passage through the outlet 34. The engine 12 is pivotably attached to the transom 14 to turn about a vertical axis A. As the engine 12 pivots, the outlet 34 turns and directs the stream of water forced through the outlet. Directing the outlet 34 to port, causes the watercraft 10 to turn to port. Likewise, when the outlet 34 is directed to starboard, the watercraft 10 turns to starboard. A reversing bucket or deflector 42 pivotally mounted downstream from the outlet 34 is selectively pivotable between a stowed position as shown and a deflecting position, in which the defector is positioned behind the outlet to deflect the stream forward past the outlet to push the boat 10 rearward. A grate (not shown) covers the inlet 32 of the passage 30 to prevent larger foreign objects from entering the passage where these objects could cause damage.

Most maintenance required for jet drive marine engines is similar to the maintenance required for conventional propeller engine. However, with jet drive engines, foreign objects such as pebbles and plant material may obstruct water passing through the inlet 34. To ensure adequate flow, the foreign objects must be cleared from the inlet periodically. Although the impeller 40 is less susceptible to damage than a conventional propeller, impellers must be inspected periodically and repaired or replaced. Because the impeller 40 is positioned inside the passage 30, a portion of the lower housing 20 must be removed to access the impeller. Thus, a particular set of tools is needed to accomplish the tasks required to maintain a jet drive marine engine.

SUMMARY

In one aspect, the present disclosure includes a multipurpose maintenance tool for performing maintenance operations on a mechanical assembly. The multipurpose maintenance tool comprises a central body and an elongated shank extending in a longitudinal direction from the central body to a lever end. The tool also includes a foreign object removing element having a foreign body engaging surface. The foreign object removing element extends from the central body generally opposite the elongated shank. A fastener engaging formation is formed on at least one of the shank, the foreign object removing element, and the central body. The fastener engaging formation is sized and shaped for engaging a fastener on the mechanical assembly to selectively tighten and loosen the fastener. Further, the tool includes a lateral extension extending laterally from the central body adapted to span an opening in the mechanical assembly and engage opposite margins adjacent the opening in the mechanical assembly so that as the shank is pivoted about the lateral extension in a predetermined angular direction, the foreign object removal surface pivots about the lateral extension in a direction corresponding to the predetermined angular direction of the shank to dislodge foreign objects from the opening in the mechanical assembly for removing the foreign objects.

In another aspect, the present disclosure includes a multipurpose maintenance tool for performing maintenance operations on a jet drive marine engine. The multipurpose maintenance tool comprises a central body and an elongated shank extending in a longitudinal direction from the central body to a lever end. The lever end has a first wrench opening sized and shaped for receiving a first fastener of the jet drive marine engine to selectively rotate the first fastener when performing maintenance operations on the jet drive marine engine. The tool also includes a foreign object removing element having a foreign body engaging surface. The element extends from the central body generally opposite the elongated shank. In addition, the tool includes a lateral extension extending laterally from the central body adapted to span an opening in the jet drive marine engine and engage opposite margins adjacent the opening in the jet drive marine engine so that as the shank is pivoted about the lateral extension in a predetermined angular direction, the foreign object removal surface pivots about the lateral extension in a direction corresponding to the predetermined angular direction of the shank to dislodge foreign objects from the opening in the jet drive marine engine for removing the foreign objects. The central body has a second wrench opening sized and shaped for receiving a second fastener of the jet drive marine engine to selectively rotate the second fastener when performing maintenance operations on the jet drive marine engine.

Further, the present disclosure includes a multipurpose maintenance tool for performing maintenance operations on a jet drive marine engine. The multipurpose maintenance tool comprises a central body and an elongated shank extending in a longitudinal direction from the central body to a lever end. Further, the tool includes a foreign object removing element having a foreign body engaging surface. The foreign object removing element extends from the central body generally opposite the elongated shank. The foreign body engaging surface faces a normal direction forming an acute angle with the longitudinal direction of the shank. In addition, the tool includes a fastener engaging formation formed on at least one of the shank, the foreign object removing element, and the central body. The fastener engaging formation is sized and shaped for engaging a fastener on the jet drive marine engine to selectively tighten and loosen the fastener. Moreover, the tool includes a lateral extension comprising a pin extending through the central body and laterally from opposite lateral faces of the central body. The lateral extension is adapted to span an opening in the jet drive marine engine and engage opposite margins adjacent the opening in the jet drive marine engine so that as the shank is pivoted about the lateral extension in a predetermined angular direction, the foreign body engaging surface pivots about the lateral extension in a direction corresponding to the predetermined angular direction of the shank to dislodge foreign objects from the opening in the jet drive marine engine for removing the foreign objects.

Other aspects of the present invention will be apparent in view of the following description and claims.

BRIEF DESCRIPTION OF THE DRAWINGS

Corresponding reference characters indicate corresponding parts throughout the drawings.

DETAILED DESCRIPTION

Figure 1:
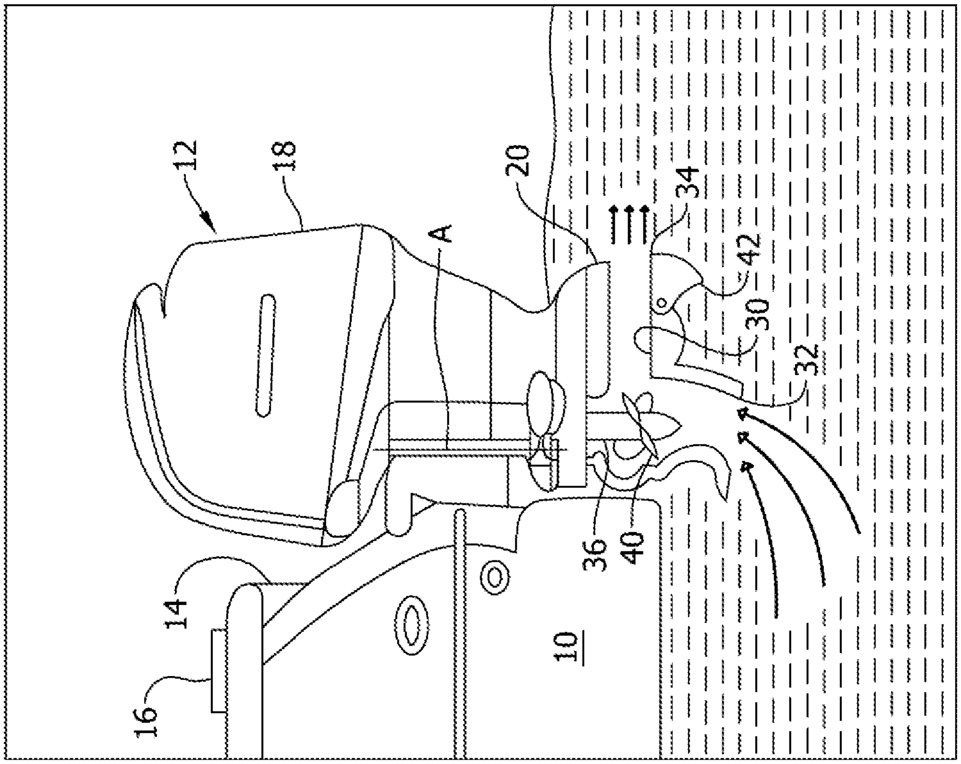
FIG. 1 (PRIOR ART)
FIG. 1 is a schematic cross section of watercraft having a conventional outboard jet drive marine engine.
Figure 2:
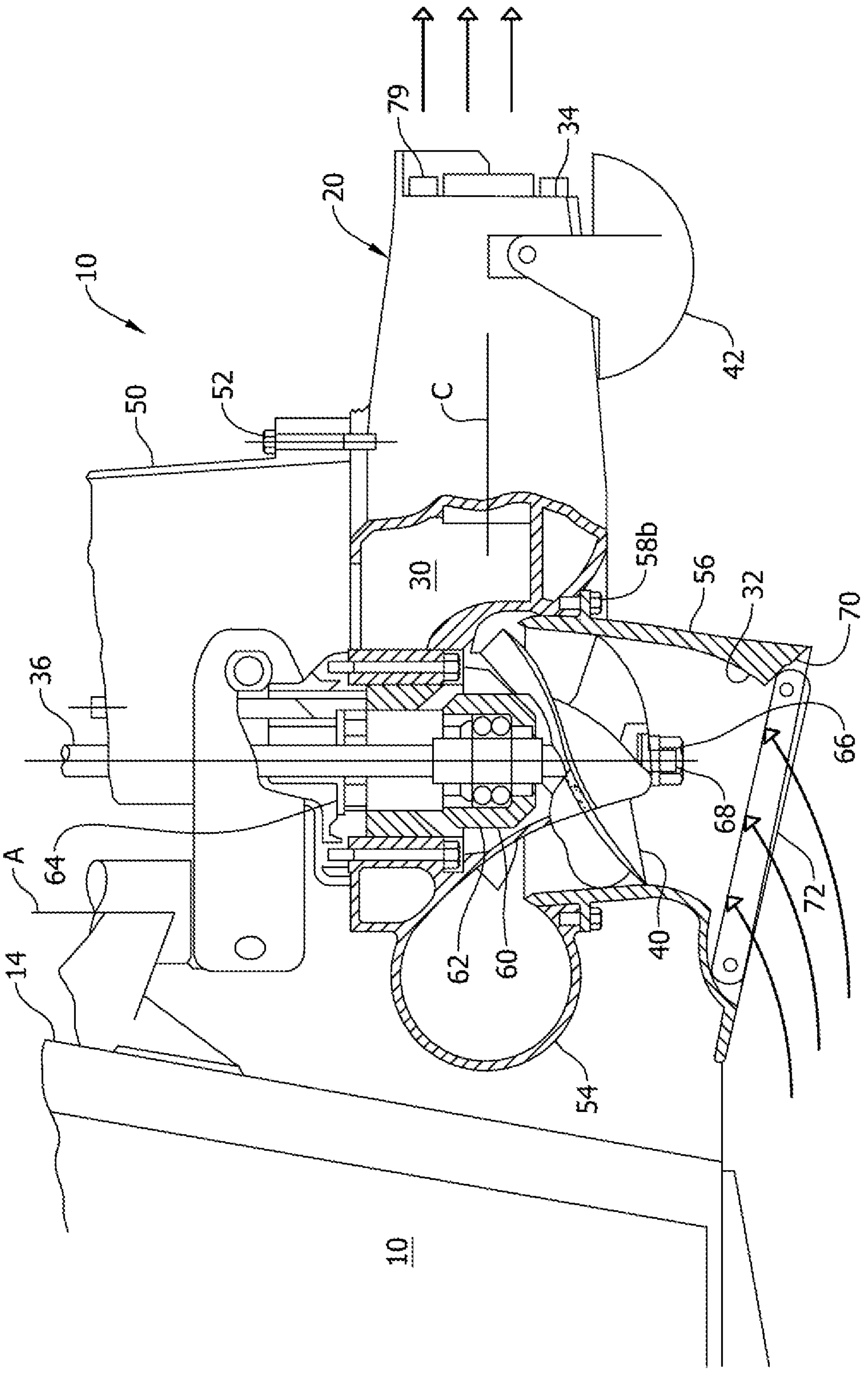
FIG. 2 (PRIOR ART)
FIG. 2 is a side elevation in partial cross section of an outboard jet drive marine engine.
Figure 3:
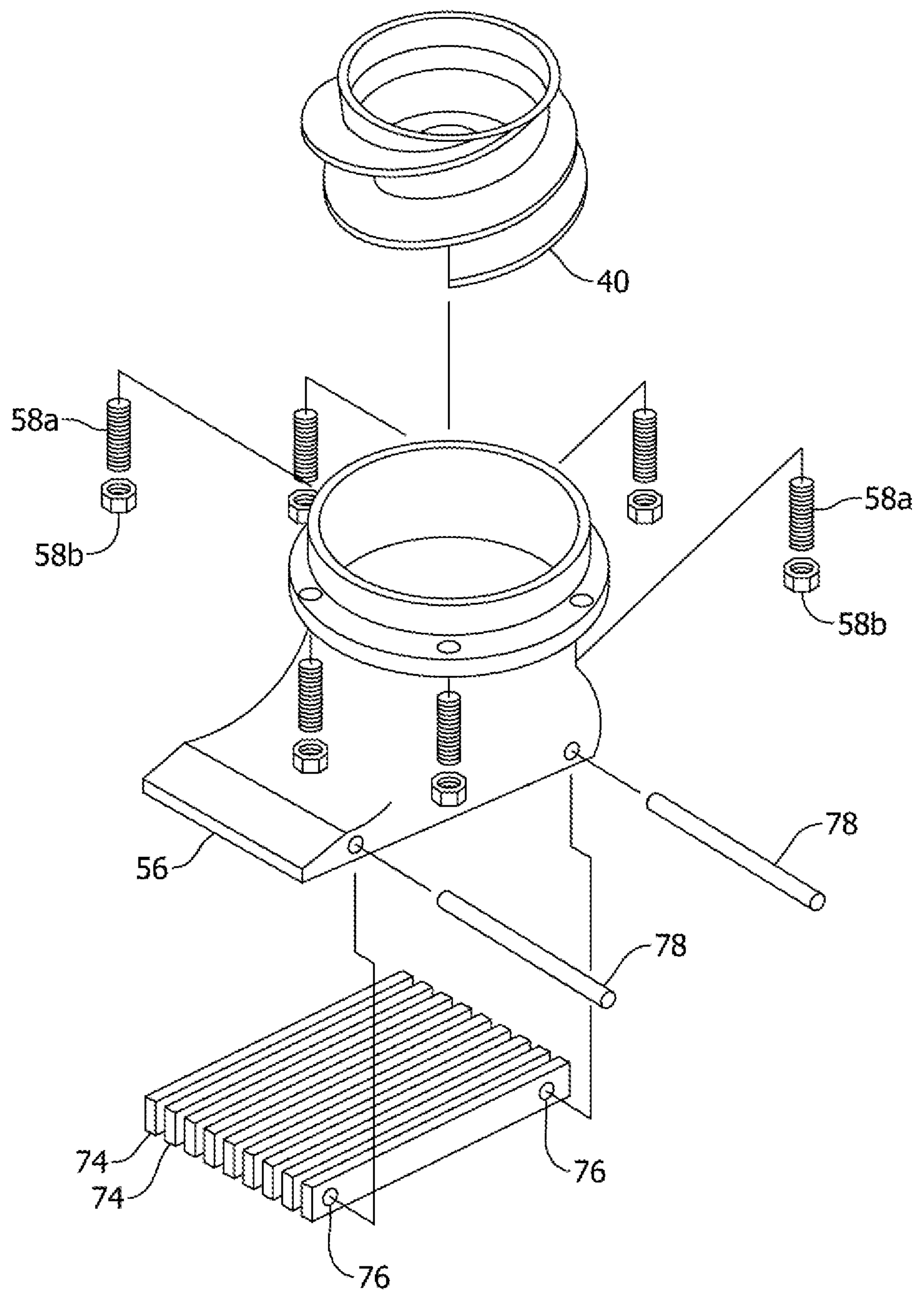
FIG. 3 (PRIOR ART)
FIG. 3 is a separated perspective of an intake assembly of the jet drive marine engine illustrated in FIG. 2.

FIG. 2 illustrates a cross section of a portion of an outboard jet drive marine engine, generally designated by 10, similar to the engine described previously with respect to FIG. 1. The engine 12 includes a mid-housing 50 connected to an engine housing (not shown) that encloses a motor (not shown). A lower housing, generally designated by 20, is connected to the mid-housing 50. Although the lower housing may be connected to the mid-housing by other means, the lower housing 20 of the illustrated configuration is connected to the mid-housing 50 by screw fasteners, e.g., hex head machine bolts 52. The lower housing 20 comprises a scroll housing 54 and an intake housing 56. Although the intake housing may be connected to the scroll housing by other means, in the illustrated configuration the intake housing 56 is connected to the scroll housing 54 by screw fasteners, e.g., threaded studs 58*a* and nuts 58*b* as shown in FIG. 3. A bearing carrier 60 is mounted in the scroll housing 54 for receiving a bearing 62 to support a lower end of the driveshaft 36. A seal assembly 64 is mounted on the scroll housing 54 above the bearing carrier 60 to seal off the mid-housing 50 interior from the scroll housing 54 interior. An impeller 40 is mounted on a lower end of the driveshaft 36 so the impeller 40 rotates with the driveshaft when the motor rotates the driveshaft. Although other means may be used to connect the impeller to the driveshaft, in the illustrated configuration the lower end of the drive shaft 36 is threaded. A screw fastener, e.g., nut 66, holds the impeller 40 in place on the drive shaft and a conventional tabbed retainer washer 68 is used to prevent the screw fastener from loosening.

As further shown in FIG. 2, the intake housing 56 includes a recess 70 for receiving a grate 72 across the inlet 32 of the passage 30 to prevent larger foreign objects from entering the jet drive passage. Although the grate may have other configurations, the grate 72 illustrated in FIG. 3 comprises a series of spaced bars 74. Each bar 74 has an opening at each for receiving a rod 78 extending laterally through the bars and the intake housing 56. Although the rods 78 may be held in place in the intake housing 56 by other means, screw fasteners, e.g., acorn nuts (not shown) are used to hold the rods in position in the intake housing 56 in some examples. Because the outboard jet drive marine engine 12 is conventional and well understood by those skilled in the art, other aspects of the engine will not be described in further detail.

In operation, the motor (not shown) rotates the driveshaft 36. As the driveshaft 36 turns, the impeller 40 rotates in the passage 30, pulling water into the passage through the inlet 32 and forcing a stream of water out of the passage through the outlet 34. The engine 12 is pivotably attached to the transom 14 for rotation about vertical axis A. An actuator or tiller (not shown) is provided to control the direction in which the engine 12 pivots. As the engine 12 pivots on the transom 14, the outlet 34 swings through an arc, directing the water stream exiting the outlet along a line generally corresponding to an outlet centerline C shown in FIG. 2. The outlet 34 may include adjustable tabs or vanes 79 for ensuring the water stream exiting the outlet 34 flows in a desired axial direction relative to the engine 12. Directing the outlet 34 to port causes the boat 10 to turn to port. Likewise, when the outlet 34 is directed to starboard, the boat 10 turns to starboard. A reversing bucket or deflector 42, pivotally connected to the engine 12 downstream from the outlet 34, is selectively pivotable (e.g., by an actuator (not shown)) to move the deflector between a stowed position as shown and a deflecting position in which the deflector is behind the outlet. In the deflecting position, the deflector 42 deflects water exiting the outlet 34 forward past the outlet to push the boat 10 rearward.

Figure 4:
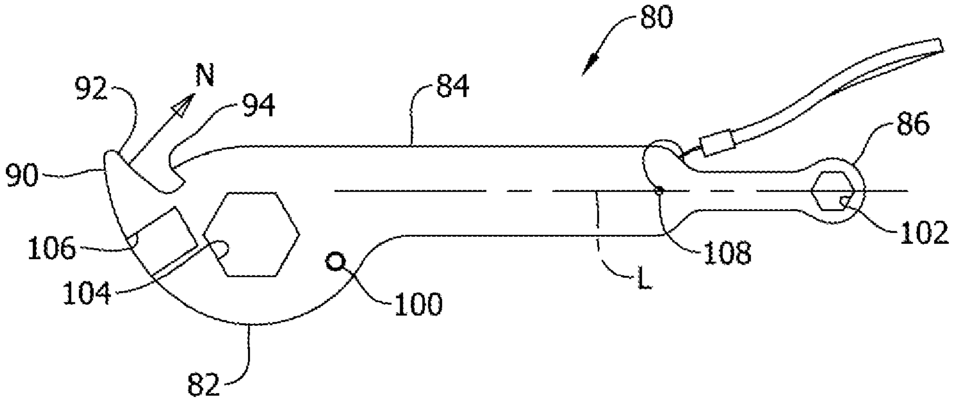
FIG. 4 is a left side elevation of a multipurpose tool for maintaining a jet drive marine engine.
Figure 5:
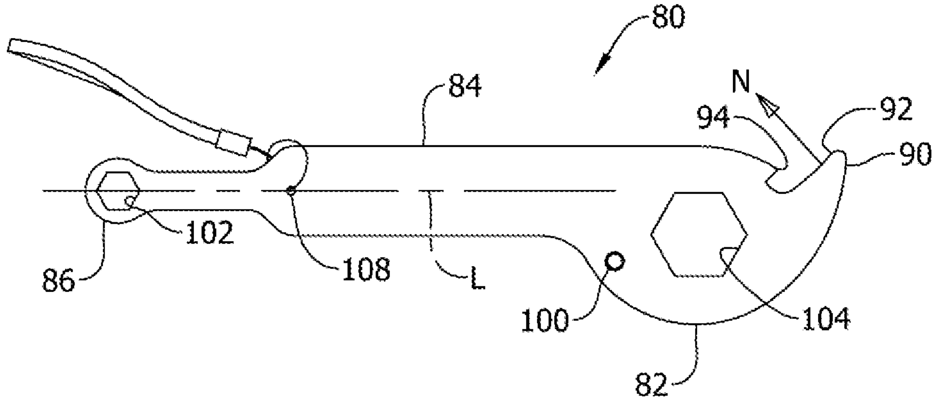
FIG. 5 is a right side elevation of a multipurpose tool.
Figure 6:
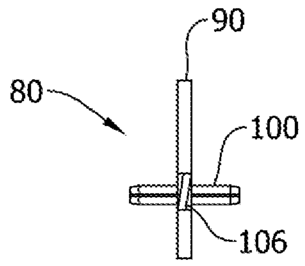
FIG. 6 is a front elevation of the multipurpose tool.
Figure 7:
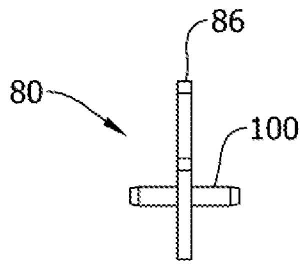
FIG. 7 is a rear elevation of the multipurpose tool.
Figure 8:
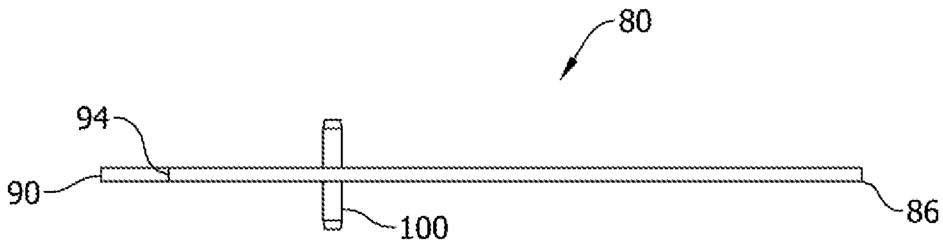
FIG. 8 is a top plan of the multipurpose tool.
Figure 9:
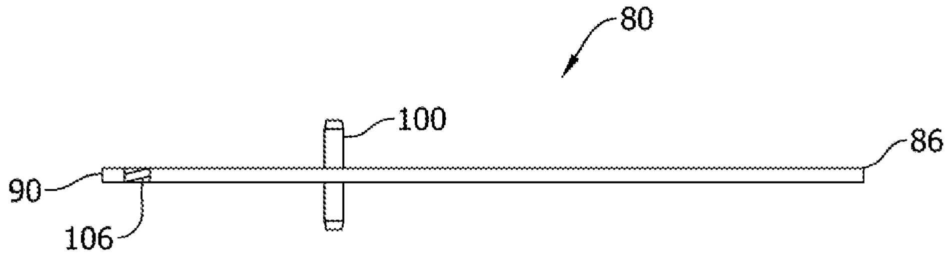
FIG. 9 is a bottom plan of the multipurpose tool.

FIGS. 4-8 illustrate a multipurpose maintenance tool, generally designated by 80, for performing maintenance operations on a mechanical assembly such as the jet drive marine engine 12 described above. The multipurpose maintenance tool 80 includes a central body 82 and an elongated shank or lever arm 84 extending in a longitudinal direction L to a lever end 86. Although the central body may have other shapes, the central body 82 of the illustrated configuration is generally round as shown in FIG. 4. Further, although the shank may have other shapes, the shank 84 of the illustrated configuration necks down to a thinner width toward the rounded lever end 86 as shown in FIG. 4. A foreign object removing hook formation or element 90 provided on the central body 82 extends generally opposite the shank 84. The foreign object removing element 90 has a foreign body engaging surface 92 adapted for engaging foreign bodies as will be explained below. In the illustrated configuration, the foreign body engaging surface 92 is oriented so it generally faces in a normal direction N extending at an acute angle (e.g., an angle in a range of about 40° to about 50°) relative to the longitudinal direction L of the shank 84. An engagement tooth 94 extends from the central body 82 adjacent the foreign body removing element 90. The engagement tooth 94 is spaced from the foreign body engaging surface 92 and adapted for use in combination with the foreign body engaging surface for engaging the adjustable tabs 79 at the outlet 34 when adjusting them. As those skilled in the art will appreciate, the tabs 79 may become misaligned during engine 12 operation requiring them to be bent back to an appropriate shape. The tooth 94 may also be used to remove bottle caps from bottles among other potential uses. A roll pin 100 is pressed into a hole in the central body 82 so the pin extends laterally from both faces of the central body. The roll pin 100 forms a lateral extension. As will be explained below, the lateral extension spans openings in the jet drive engine grate 72, providing a fulcrum to pry foreign objects from between the bars 74.

A first opening 102 extends through the shank 84 at its lever end 86, and a second opening 104 extends through the central body 82 adjacent an opposite end of the shank 84. The first and second openings 102, 104 form fastener engaging formations sized and shaped for engaging a screw fastener on the jet drive engine to selectively tighten and loosen the fastener. Although the fastener engaging formations may have other shapes, in the illustrated example, the first and second openings 102, 104 are hexagonal wrench openings to selectively turn hex head bolts and nuts. The first and second openings may have other sizes, but the illustrated openings 102, 104 are sized so distances between opposing flats are 0.38 inches and 0.95 inches, respectively. Thus, the illustrated openings 102, 104 are sized for receiving ⅜ in. and 15/16 in. hex head fastener flat-to-flat widths, respectively. These sizes correspond with common fastener sizes used on jet drive engines 102. Opening 102 is sized for receiving the fasteners **58*b* used to connect the intake housing 56 to the scroll housing 54 and opening 104 is sized for receiving the fastener 66 holding the impeller 40 on the drive shaft 36, respectively. A wedge 106 is provided adjacent opening 104. As those skilled in the art will appreciate, the wedge 106 is adapted for insertion between a face of fastener 66 and a corresponding tab on the retainer washer 68. With the wedge 106 in this position, the tool 80 may be pivoted about the wedge to bend the tab away from the fastener 66 so the fastener can be unscrewed using opening 104. A hole 108 is provided in the tool 80** for receiving a conventional wrist lanyard (not shown) to prevent the tool from being dropped and lost when being used while the watercraft is on water.

Figure 10:
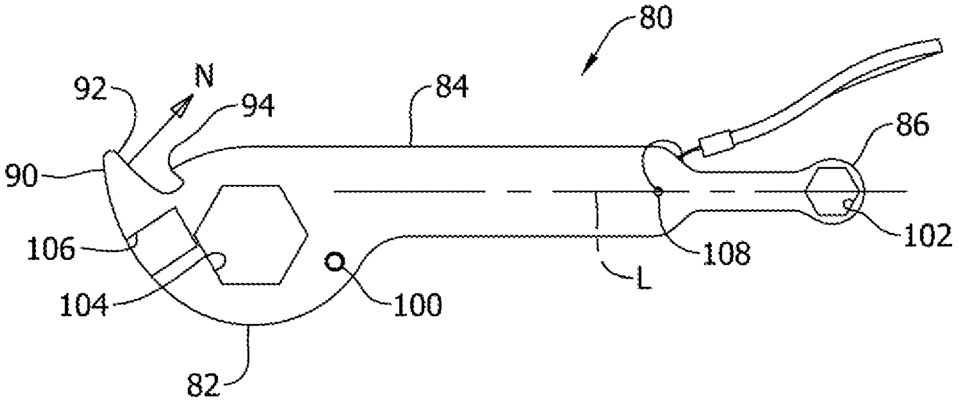
FIG. 10 is a left side elevation of alternative configuration of a multipurpose tool for maintaining a jet drive marine engine.

FIG. 10 illustrates a wrench 80 having a similar configuration to the wrench shown in FIGS. 4-9. Instead of having openings as described above, the first opening 102 of the wrench shown in FIG. 10 is sized so opposing flats are 0.51 inches apart, and the second opening 104 is sized so opposing flats are 1.14 inches apart. Thus, the openings 102, 104 illustrated in FIG. 10 are sized for receiving ½ in. and 1⅛ in. hex head fastener flat-to-flat widths, respectively. These fastener sizes are common on other jet drive marine engines 12. As other features of the wrench shown in FIG. 10 are identical to those described above with respect to FIGS. 4-9, the wrench of FIG. 10 will not be described further.

As those skilled in the art will appreciate, the tool 80 may be made of suitable materials such as hardened tool steel or stainless steel (e.g., ASTM 304 stainless). Further, the tool 80 may be coated or plated to prevent corrosion. In one example, markings are provided on one or both faces of the tool, e.g., the shank faces, to indicate the source of the tool and other relevant information. Although the tool may be constructed from other stock, the tool 80 of the illustrated configuration is machined from plate or bar stock having a thickness of about 3/16 inch. The tool 80 may be machined or formed using conventional industrial processes such as casting, electro-discharge machining, laser cutting, and milling.

The intake housing 56 must usually be removed from the scroll housing 54 to access the impeller 40 for inspection or repair. The first hex opening 102 at the lever end 86 of the shank 84 is sized to fit the nut **58*b* holding the intake housing 56 to the scroll housing 54. The mechanic positions the opening 102 over the nut 58*b* and turns the shank 84 like a box-end wrench to loosen and remove the nut. The tool 80 may be used in a similar manner to refasten the intake housing 56 to the scroll housing 54. The second hex opening 104 is sized to fit the nut 66 fastening the impeller 40 to the driveshaft 36. Thus, to remove the impeller 40, the mechanic positions the opening 104 over the nut 66 and turns the shank 84** to loosen the nut so the impeller may be pulled from the driveshaft.

As previously mentioned, organic material and small pebbles become lodged in the grate 72 in the spaces between the bars 74 during use, especially when using the engine 12 in shallow water. The foreign object removing element 90 and particularly the foreign body engaging surface 92 is adapted to remove foreign bodies from the spaces in the grate 72. The thickness of the central body 82 and foreign body removing element 90 is selected to allow these features of the tool to be inserting into the space between the bars 74 of the grate 72. Further, the pin 100, which extends from each face of the central body 82, is sized to span each opening or space and engage opposite margins adjacent the opening in the grate 72. As will be appreciated by those skilled in the art, the pin 100 may be used as a fulcrum to pry objects from the grate 72. Moreover, the length of the shank 84 provides a lever to increase the mechanical advantage when using the tool 80 in this way. In addition, the shape of the central body 82, which includes a curved lower surface having a varying radius, allows the foreign body removing element 90 to be inserted near ends of the grate 72 and the arcuate lower surface to engage the intake housing 56 adjacent the end of the grate. The arcuate lower surface of the central body 82 then provides a fulcrum to pry objects from the grate 72 when the pin 100 does not contact the grate.

When introducing elements in this description, the articles “a”, “an”, “the”, and “said” are intended to mean that there are one or more of the elements. The terms “comprising”, “including”, and “having” are intended to be inclusive and mean that there may be additional elements other than the listed elements.

As those skilled in the art could make various changes to the above constructions, products, and methods without departing from the intended scope of the description, all matter in the above description and accompanying drawings should be interpreted as illustrative and not in a limiting sense.

The invention claimed is:

1. A multipurpose maintenance tool for performing maintenance operations on a mechanical assembly, said multipurpose maintenance tool comprising:

a tool body having a generally flat surface and a uniform thickness;

an elongated lever arm extending from the tool body in a longitudinal direction extending parallel to the flat surface to a lever end;

a foreign object removing element extending from the tool body and coplanar with the elongated lever arm, said foreign object removing element having an object engaging surface extending perpendicular to the flat surface of the tool body, said object engaging surface forming an obtuse angle with the longitudinal direction;

a fastener engaging opening formed on at least one of the tool body and the lever end for engaging a fastener on the mechanical assembly to selectively turn the fastener; and a lateral extension extending through the tool body perpendicular to the flat surface and protruding from opposite faces of the tool body for spanning between opposite margins of the mechanical assembly to position the object engaging surface between the margins, so the lever arm is pivotable about the lateral extension thereby pivoting the object engaging surface about the lateral extension to dislodge foreign objects from the mechanical assembly.

2. The multipurpose maintenance tool as set forth in claim 1, wherein the fastener engaging opening comprises a hexagonal wrench opening.

3. The multipurpose maintenance tool as set forth in claim 2, wherein:

said hexagonal wrench opening is a first hexagonal wrench opening formed on the lever end; and the maintenance tool has a second hexagonal wrench opening formed on the tool body.

4. The multipurpose maintenance tool as set forth in claim 1, wherein the first hexagonal wrench opening is sized for smaller fastener heads than the second hexagonal wrench opening.

5. The multipurpose maintenance tool as set forth in claim 1, further comprising an engagement tooth having a portion facing the object engaging surface.

6. The multipurpose maintenance tool as set forth in claim 5, wherein said portion of the engagement tooth facing the object engaging surface extends generally parallel to the object engaging surface.

7. The multipurpose maintenance tool as set forth in claim 1, wherein the tool body and the lever arm have a common thickness.

8. The multipurpose maintenance tool as set forth in claim 7, further comprising a wedge that tapers to an edge thickness that is less than the common thickness.

9. The multipurpose maintenance tool as set forth in claim 8, wherein the wedge is positioned on the tool body.

10. The multipurpose maintenance tool as set forth in claim 1, further comprising a wrist lanyard.

11. A multipurpose maintenance tool for performing maintenance operations on a jet drive marine engine, said multipurpose maintenance tool comprising:

a tool body having opposite planar faces and a uniform body thickness defined by said opposite planar faces;

an elongated lever arm extending in a longitudinal direction from the tool body to a lever end, said lever arm having an arm thickness equal to the body thickness, said lever end having a first fastener wrench formation extending through the arm thickness sized and shaped for receiving a first fastener of the jet drive marine engine to selectively rotate the first fastener when performing maintenance operations on the jet drive marine engine;

a foreign object removing element extending from the tool body between said opposite planar faces and having an element thickness equal to the body thickness and an object engaging surface forming an obtuse angle with the longitudinal direction; and a lateral extension extending from said opposite faces of the tool body configured to span an opening in the jet drive marine engine and engage opposite margins defining the jet drive marine engine opening so the object engaging surface pivots about the lateral extension through the jet drive marine engine opening when a user inserts the object engaging surface into the opening, engages the lateral extension with the opposite margins defining the opening, and pivots the lever arm about the engaged lateral extension;

wherein the tool body has a second fastener wrench formation extending through the body thickness sized and shaped for receiving a second fastener of the jet drive marine engine to selectively rotate the second fastener when performing maintenance operations on the jet drive marine engine.

12. The multipurpose maintenance tool as set forth in claim 11, wherein the second fastener wrench formation is sized differently than the first fastener wrench formation.

13. The multipurpose maintenance tool as set forth in claim 12, wherein the second fastener wrench formation is shaped identically to the first fastener wrench formation.

14. The multipurpose maintenance tool as set forth in claim 13, wherein:

the first fastener wrench formation comprises a first hexagonal opening extending through the lever end; and the second fastener wrench formation comprises a second hexagonal opening extending through the tool body.

15. The multipurpose maintenance tool as set forth in claim 11, wherein the body thickness, the arm thickness, and the element thickness are substantially uniform and equal.

16. The multipurpose maintenance tool as set forth in claim 11, further comprising a wedge having an edge thickness that is less than arm thickness.

17. The multipurpose maintenance tool as set forth in claim 16, wherein the wedge is positioned on the tool body.

18. The multipurpose maintenance tool as set forth in claim 11, further comprising an engagement tooth extending from the tool body and having a portion extending generally parallel to the object engaging surface.

19. The multipurpose maintenance tool as set forth in claim 11, further comprising a wrist lanyard.

* * * * *